Oct. 31, 1950     H. H. PRATT     2,527,762
ABRASIVE DISK SUPPORT
Filed Oct. 14, 1947
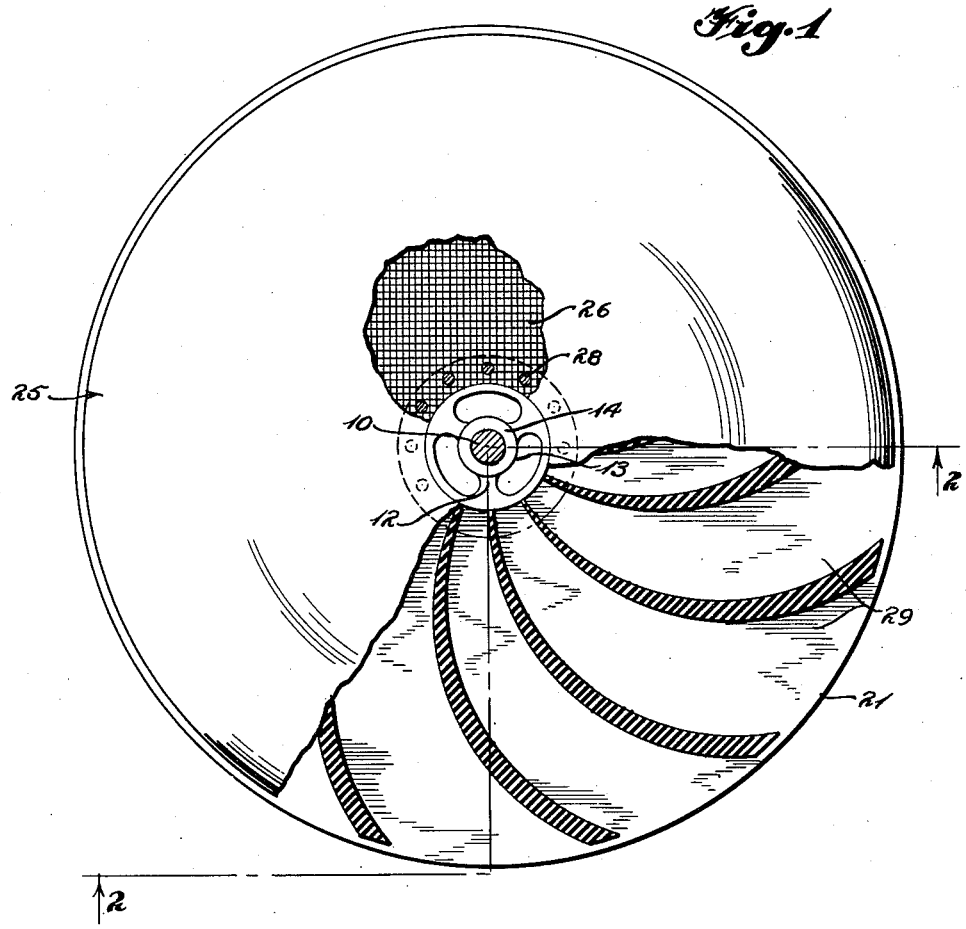
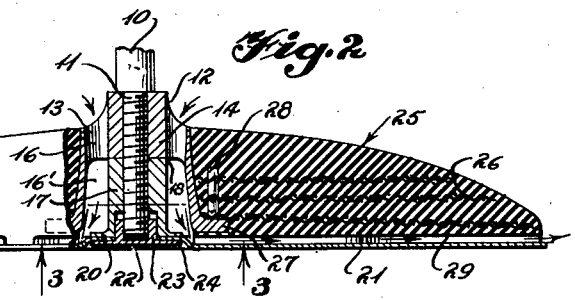
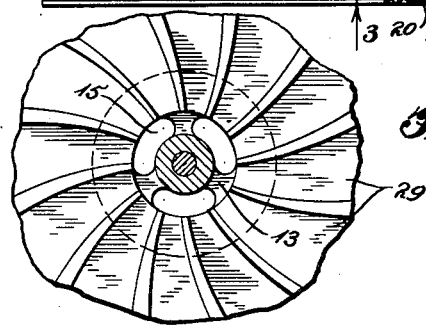
INVENTOR.
*Harold H. Pratt*
BY
*Cushman, Darby & Cushman*
ATTORNEYS Patented Oct. 31, 1950

2,527,762

UNITED STATES PATENT OFFICE 2,527,762

ABRASIVE DISK SUPPORT

Harold H. Pratt, Fairmount, Ind.

Application October 14, 1947, Serial No. 779,755

7 Claims. (Cl. 51—197)

The present invention relates to a support for abrasive discs and has for its primary purpose to provide a backing which is flexible enough to allow the disc to readily abrade surfaces of widely varying contours.

Another object of the invention is to provide a support having means for continuously cooling both the support and the disc to thereby reduce the effects of heat incident to the friction of the disc with the work.

A further object of the invention is to provide a construction wherein the disc may be employed to abrade a plane or flat surface, as well as for contour surface abrasion.

Referring to the drawings:

Figure 1 is a view partly in elevation and partly in section with parts of the construction broken away to more completely illustrate the air circulating means.

Figures 2 is a section on the line 2—2 of Figure 1, and

Figure 3 is a detailed section taken on the line 3—3 of Figure 2.

Referring to the drawings, the rotating spindle upon which the support and disc are mounted is indicated at 10. This spindle has a reduced threaded portion 11 upon which is carried the hub 12 of a flexible support. As shown, the hub is provided with spiders 13 which support a threaded tubular portion 14 for engagement with the threaded portion 11 of the spindle 10. Between the spiders the hub is provided with openings 15, which communicate with the outwardly tapering open lower portion 16 of the body of the hub. A spacer member 17 is preferably threaded upon the portion 11 to engage the undersurface of the tubular portion 14 of the hub 12, as shown at 18, and at its lower end is provided with a flat circular flange 20. The abrasive disc 21 is centered and united to the spacer member 17 for rotation on the support by means of a nut 22 having an upstanding hollow projection 23 which is internally threaded to engage the lower end of the threaded portion 11 of the spindle 10 as shown in Figure 2. The projection 23 is received in a recess 23' in the base of the spacer member, as shown. The nut 22 has a flat circular head 24 which cooperates with the flat circular flange 20 whereby when the nut 22 is passed through the center opening of the disc 21 and tightened upon the threaded portion 11, the central area of the disc is depressed inwardly and the head 24 of the nut 22 is also disposed inwardly from the plane of the disc 21, as shown in Figure 2. In other words, the threaded portion 11 extends inwardly such a distance with relation to the size of the nut 22, that when the latter is screwed home to center the disc on the threaded portion 11 and secure the disc for rotating abrading action, the central portion of the disc is drawn inwardly toward the open end of the hub, as shown in Figure 2, and the head 24 of the nut 22 lies inwardly of the abrasive surface of the disc. Therefore, when the disc is used to abrade a plane or flat surface the nut 22 will not interfere by engaging such surface.

The flexible support for the disc 21 is illustrated as a whole at 25 and is substantially hemispherical in form. It is constructed of flexible material, preferably vulcanized rubber, and may be provided with reinforcing layers of wire mesh, plastic or fiber, as shown at 26. The rubber backing or support may be made of a single layer of rubber or constructed of laminations united together. Preferably, the backing 25 is vulcanized to the hub 12, and in order to firmly retain the backing on the hub, the latter is provided with an outwardly extending circular flange at its lower edge, as shown at 27. Integrally or otherwise carried by the flange 27 are a plurality or upstanding circumferentially spaced pins 28. The backing 25 in plastic condition is applied to the hub and the pins 28 and flange 27 projected therein, as shown. This assembly is then vulcanized, whereby the hub 12 and backing 25 are firmly connected together. The backing 25 is flexible enough so that the abrasive disc may be used to abrade surfaces of varying contours.

Referring to Figure 1, it will be noted that the base of the backing 25 is molded or embossed so as to provide a series of spiral passages 29 radiating from the base of the hub 12 and extending outwardly to open into the outer peripheral edge of the backing 25. When the spindle 10 carrying the support 25 and the disc 21 are rotating, air is drawn into the openings 15 of the hub, and passes through the passageway 16' therein between the spacer 17 and the inner wall of the hub, and is discharged outwardly through the space between the outer edge of the flange 20 of the spacer 17 and the inner corner edge of the hub 12 with its flange 27. The air so discharged is introduced to the spiral passages 29 formed through the bottom surface of the base of the backing. Due to the rotation of the assembly, this air is directed along the opposed lower surface of the base of the support 25 and the inner surface of the abrasive disc 21 over the entire area thereof and to the outer peripheral edges of the support and abrasive disc where it is discharged to the atmosphere. Relative to the continuous circulation of air between the opposed surfaces of the abrasive disc and the backing, of course, when the assembly is rotated in a direction opposite to that in which the air is directed to the outer peripheral edge of the support, the air is impelled in a reverse direction and is discharged through the openings 15. In this manner, the effects of the heat created by the friction of the abrading operation are effectively overcome. By elongated passageways and elongated raised portions is meant a construction by which the abrasive disc is always spaced from the support and air is continuously impelled through such space between the disc and the support.

In the foregoing description and in the drawing, I have illustrated the preferred embodiment of the invention, but it is to be understood that modifications and changes may be made therein within the purview of the appended claims.

I claim:

1. A support for abrasive discs comprising a backing having means for connection to a rotatable spindle, a plurality of air passages in circumferential spaced relation extending through the backing and disposed adjacent the central portion thereof, said backing having its surface which is adapted to face the back of an abrasive disc provided with elongated raised impeller portions extending in a direction from the central portion of the backing toward the periphery thereof to form air passages between the opposed surfaces of the disc and backing communicating with the first-mentioned air passages for continuously circulating air between said disc and said backing.

2. A support for abrasive discs comprising a backing having means for connection to a rotatable spindle, a plurality of air passages in circumferential spaced relation extending through the backing, said backing, having its surface which is adapted to face the back of an abrasive disc, provided with a plurality of elongated passageways defining impellers extending toward the periphery of the backing and communicating with the first-mentioned air passages for continuously circulating air between the backing and the disc.

3. A support for abrasive discs comprising a backing having means for connection to a rotatable spindle, a plurality of air passages in circumferential spaced relation extending through the backing and disposed adjacent the central portion thereof, said backing, having its surface which is adapted to face the back of an abrasive disc, provided with elongatjed raised impeller portions which during rotation cause circulation of air through the said passages and between the backing and the abrasive disc supported on the backing.

4. A support for abrasive discs comprising a backing, a hub disposed centrally of said backing and connected thereto, said hub having means for connection to a rotatable spindle, a plurality of air passages in circumferential spaced relation extending through the hub, said backing, having its surface which is adapted to face the back of an abrasive disc, provided with elongated raised impeller portions extending in a direction from the central portion of the backing toward the periphery thereof to form air passages between the opposed surfaces of the disc and backing communicating with the first-mentioned air passages for continuously circulating air between said disc and said backing.

5. A support for abrasive discs comprising a backing having means for connection to a rotatable spindle, a plurality of air passages in circumferential spaced relation extending through the backing, said backing, having its surface which is adapted to face the back of an abrasive disc, provided with a plurality of spiral passageways defining impellers extending toward the periphery of the backing and communicating with the first-mentioned air passages for continuously circulating air between the backing and the disc.

6. A support for abrasive discs comprising a backing, a hub disposed centrally of said backing and connected thereto, said hub having means for connection to a rotatable spindle, a plurality of air passages in circumferential spaced relation extending through the hub, said backing, having its surface which is adapted to face the back of an abrasive disc, provided with a plurality of spiral passageways defining impellers extending toward the periphery of the backing and communicating with the first-mentioned air passages for continuously circulating air between the backing and the disc.

7. An abrasive disc support comprising a backing member having a hub member for connection to a rotatable spindle, said backing member having its surface which is adapted to face the back of an abrasive disc provided with circumferentially spaced elongated raised impeller portions extending in a direction from the central portion of the back member toward the periphery thereof to form air passages between the opposed surfaces of the abrasive disc and the backing member, said backing member having a plurality of circumferentially spaced air passages adjacent the central portion thereof communicating with the air passages extending between the backing member and the abrasive sheet whereby upon rotation of the abrasive disc and its supporting member air will be caused to flow between the abrasive disc and its backing member.

HAROLD H. PRATT.

REFERENCES CITED

The following references are of record in the file of this patent:

UNITED STATES PATENTS

| Number | Name | Date |
| --- | --- | --- |
| 505,644 | Webster | Sept. 26, 1893 |
| 617,233 | DeWolfe | Jan. 3, 1899 |
| 1,291,572 | Lorenz | Jan. 14, 1919 |
| 1,353,966 | Lorenz | Sept. 28, 1920 |
| 1,355,345 | Lorenz | Oct. 12, 1920 |
| 2,132,917 | Albertson | Oct. 11, 1938 |
| 2,172,407 | Ramey | Sept. 12, 1939 |
| 2,410,812 | DeMichel | Nov. 12, 1946 |